Patented Aug. 6, 1946

2,405,353

UNITED STATES PATENT OFFICE 2,405,353

POLYAZO DYESTUFFS OF THE STILBENE SERIES AND PROCESS OF MAKING SAME

Walter Hanhart, Riehen, Switzerland, assignor to Society of Chemical Industry in Basle, Basel, Switzerland, a Swiss firm No Drawing. Application July 27, 1943, Serial No. 496,348. In Switzerland August 1, 1942

10 Claims. (Cl. 260—143)

1

The present invention is concerned with new polyazo dyestuffs of the stilbene series. More particularly it is an object of the present invention to provide dyestuffs of the said series which are capable of forming complex metal compounds, especially copper compounds. Still more particularly the present invention provides a series of dyestuffs of the said kind which are perfectly soluble in form of their normal salts, such as sodium salts, but become substantially insoluble on conversion into complex metal compounds, thus acquiring a very good fastness to wet-treatments on after-coppering on the fiber.

Hitherto azo dyestuffs of the stilbene series capable of forming complex metal compounds have chiefly been obtained by using salicylic acid and its substitution products as components. Since salicylic acids are necessarily used as terminal component the possibilities of variation of components are somewhat restricted and many valuable shades are not obtained therefore. Furthermore many of the previously known stilbene dyestuffs are not fast to perspiration and to acids.

It has now been found that valuable polyazo dyestuffs of the stilbene series can be obtained if a 2-aminobenzoic acid be used as at least one middle component in the structure of the dyestuff, and if, if desired, an agent yielding metal be allowed to act upon the dyestuff obtained.

The compounds of the stilbene series to be used as parent materials according to the present process can be either symmetric or asymmetric in structure and may contain, for example, two similar or dissimilar substituents—such as nitro or amino groups—which enter into the reaction during the formation of the dyestuff. In addition, these stilbene derivatives can also contain further substituents, for example, solubilizing groups, such as sulphonic acid groups. Other stilbene derivatives which come into consideration as parent materials are those which contain more than one stilbene radical and which are obtainable, for instance, by a link-forming reaction such as urea formation or the reductive linkage of nitro-stilbene derivatives, which may also contain azo groups already. The most important parent materials are 4:4'-diamino- or 4:4'-dinitro-stilbene-2:2'-disulphonic acid and 4-nitro-4'-aminostilbene-2:2'-disulphonic acid.

As middle components, use may be made in many ways of 2-amino-1-benzoic acids. For purposes of union with diazo compounds of the stilbene series, they are preferably used as coupling components in the form of ω-methane sulphonic acids, obtained in known manner with the help of formaldehyde-bisulphite, whereupon the ω-methane sulphonic acid group is again eliminated by means of saponifying agents and the amino group freed for further reaction. In this way, diazostilbenes, containing one or more

2 than one—for example, two—diazo groups, can be coupled with one or more than one molecule of a 2-aminobenzoic acid. It is furthermore also possible to unite the radical of a 2-aminobenzoic acid with a stilbene radical by means of a condensation reaction, for example, by condensing a nitro group present in the one component with a reactive group (for instance, an amino group) present in the other component. In particular, stilbene derivatives containing nitro groups can be condensed with 2-aminobenzoic acids which contain reactive groups, for example, a further amino group. As an example, 4:4'-dinitrostilbene-2:2'-disulphonic acid can be condensed with either one or two molecules of 2:5-diaminobenzoic acid. A further method of working makes use of both the above methods; for example, 4-amino-4'-nitrostilbene-2:2'-disulphonic acid is diazotized, coupled with 1 molecule of 2-aminobenzoic acid (in the form of the ω-methane-sulphonic acid), and the resultant dyestuff, which still contains a nitro group, condensed with 1 molecule of 2:5-diaminobenzoic acid.

In case dyestuffs which contain more than one stilbene radical have to be prepared by the present process, the union, for example, of two nitrostilbene derivatives, can be carried out by first of all preparing a monoazo or polyazo dyestuff of the stilbene series, containing, for example, a still free amino or nitro group, and only then uniting two azo dyestuffs containing stilbene radicals to form one molecule by means of a link-forming reaction.

The methods of working described above which are to be used in the present process are of themselves known. Thus, for example, the coupling of diazo compounds with the ω-methane sulphonic acids obtained from 2-aminobenzoic acids is carried out in a weakly acid—for example, a weakly acetic acid—medium, which may also contain sodium acetate if necessary. The condensation of nitrostilbenes with diamino-benzoic acids can be carried out for example, in strongly alkaline media—for instance, in media containing sodium hydroxide—at raised temperature, with or without excess pressure. The linking of two amino groups with urea formation by means of phosgene is generally known. The reductive linkage of two nitro groups can also be carried out in known manner, for example, in alkaline medium with the help of a suitable reducing agent, such as grape sugar.

In the last-named cases, azoxy groups, in addition to azo groups, can also be formed. In conformance with this, dyestuff mixtures can be obtained which contain azo groups in addition to azoxy groups in the same or in different dyestuff molecules.

The intermediate dyestuffs prepared by means of a 2-aminobenzoic acid, as middle component, according to the present process can be united, after further diazotization, with other components as may be desired; such components may belong, for example, to the benzene or naphthalene series (naphthols and naphthol sulphonic acids), or may also often possess an open chain (aceto-acetic arylides). As end components, it is preferable to select substances which permit coupling in the ortho-position to a hydroxyl group; in such circumstances, the hydroxyl group controlling the coupling can advantageously belong to a heterocyclic ring, for instance, a pyrazolone ring.

By the present process a series of particularly valuable, chiefly red dyestuffs is obtained if tetrazotized diamines of the general formula

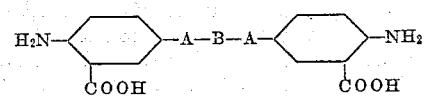

in which A represents an azo or azoxy group and B represents a group containing at least one stilbene radical, are united with pyrazolones. The pyrazolones to be used as coupling components can contain, for example, an alkyl—especially a methyl—group in the 3-position and can be unsubstituted in the 1-position, or they may also contain substituents, such as aryl groups, especially phenyl groups, in the 1-position which, in their turn, can again contain substituents. Among the latter, mention may be made of water-solubilizing groups, such as sulphonic acid groups or carboxylic acid groups, as well as the salicylic acid grouping. Among the non-water-solubilizing groups, mention should be made of the nitro and sulphamide groups. The coupling with these pyrazolones takes place preferably in an alkaline medium, for example, in the present of soda.

If 2-aminobenzoic acids containing, in the 5-position, a group capable of being converted into an amino group be coupled with pyrazolones, and these dyestuffs, after their conversion into aminoazo dyestuffs, be condensed with the corresponding nitrostilbene derivatives, the polyazo dyestuffs described above are similarly obtained.

The dyestuffs obtainable by the present process can be used for the dyeing and printing of the most varied materials, for example, animal fibers (silk, wool, etc.), but chiefly cellulosic fibers. Among the latter class of fibers, mention may be made of cotton, linen, and other vegetable fibers, also rayon and rayon staple fibers derived from regenerated cellulose, as well as composite fibers and fabrics of all types. The dyeing process advantageously includes a known after-treatment with metal salts such as is commonly used in connection with substantive dyestuffs, in which case metal salts yielding copper preferably come into consideration. The after-coppering treatment can be carried out in the dye-bath itself or in a fresh bath as desired. In the former case, the agents yielding copper which chiefly come into consideration are those which are stable in the presence of weak alkalis, for example, complex copper tartrates, which can be used in weakly alkaline—for example, weakly soda-alkaline—dyebaths (cf. F. P. 809,893).

In many cases the treatment of the dyestuff with agents yielding metal can also take place either before or during the dyeing operation, for example, in substance or in the dyebath by methods of themselves known.

The dyeings obtained by means of the present dyestuffs are remarkable, to a certain extent, for their valuable shades and good fastness to wet treatments—especially washing, perspiration, and acid cross-dyeing—in combination with good fastness to light.

The following examples illustrate the invention, the parts being by weight:

*Example 1*

37 parts of 4:4'-diaminostilbene-2:2'-disulphonic acid are tetrazotized in known manner and are then coupled, while cooling with ice, with 27.4 parts of 2-aminobenzene-1-carboxylic acid in the form of its ω-methane sulphonic acid in the presence of sodium acetate. When no further traces of diazo compound can be detected, the reaction mixture is acidified with hydrochloric acid and a quantity of sodium chloride equal in weight to about 10 percent of the volume of the mixture is added, the precipitated dyestuff being separated by filtration. The dyestuff paste obtained is then dissolved in water by addition of caustic soda. In order to eliminate the ω-methane sulphonic acid group, the reaction mixture is allowed to stand overnight with an excess of caustic soda, or the alkaline solution can simply be heated. By addition of a weight of sodium chloride equal to about 30 percent of the volume the disazo dyestuff is precipitated. If required, it can be purified by reprecipitation. In the dry state it is a red-brown powder which dissolves in conc. sulphuric acid with a red-violet, in water with a reddish-yellow coloration. It may be precipitated by acids from its aqueous solution, giving a blue precipitate.

*Example 2*

47.4 parts of the disodium salt of 4:4'-dinitrostilbene-2:2'-disulphonic acid are dissolved in 1500 parts of hot water. 160 parts of caustic soda of 30 percent strength and 33 parts of 2:5-diaminobenzene-1-carboxylic acid are added, and the reaction mixture is boiled under reflux for about 18 hours. It is then salted out with 450 parts of sodium chloride; after cooling, the precipitated dyestuff is filtered off and dried. It is a red-brown powder which dissolves in conc. sulphuric acid with a red-violet coloration. In water it dissolves with a reddish-yellow coloration and may be precipitated as a blue precipitate by addition of acids. The dyestuff possibly possesses the following constitution

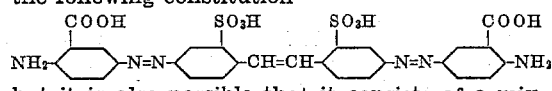

but it is also possible that it consists of a mixture of this compound with the compounds of the formulae

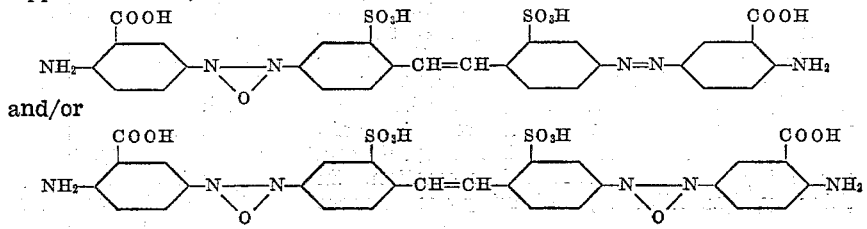

and/or

Example 3

55 parts of the monoazo dyestuff (dyestuff acid) obtainable by acetic acid coupling of 1 mol of diazotized 4-nitro-4'-amidostilbene-2:2'-disulphonic acid and 1 mol of 2-aminobenzene-1-carboxylic acid in the form of the ω-methane sulphonic acid and subsequent elimination of this group are dissolved in 500 parts of hot water by addition of 225 parts of caustic soda of 30 percent strength. After addition of 18 parts of 2:5-diaminobenzene-1-carboxylic acid, the reaction mixture is boiled for 12 hours under reflux. The dyestuff which separates on cooling is filtered off and dried. It is a red-brown powder which dissolves in conc. sulphuric acid with a red-violet coloration and in water to a reddish-yellow solution. The blue dyestuff acid is precipitated from the aqueous solution by addition of acids. Its behavior shows it to be practically identical with the dyestuff described in Example 1.

Example 4

6.6 parts of the dyestuff obtained in Example 1, 2 or 3 are dissolved in 100 parts of water in the form of its sodium salt. 1.4 parts of sodium nitrite are added, and the solution is poured into a mixture of 11 parts of hydrochloric acid of 30 percent strength, 40 parts of water and some ice whilst stirring strongly. After stirring for several hours at 5–10° C. the reaction mixture is added whilst cooling to a solution of 3.5 parts of 1-phenyl-3-methyl-5-pyrazolone made alkaline with sodium carbonate. When coupling is complete, the precipitated dyestuff is filtered off and dried. It is a red-brown powder which dissolves in water to a red and in conc. sulphuric acid to a blue solution.

It dyes cotton, by the one- or two-bath after-coppering process, in fast red shades of good fastness to washing and light.

A more yellowish dyestuff is obtained if the 1-phenyl-3-methyl-5-pyrazolone used be replaced by the corresponding quantity of 1-(3'-sulphamidophenyl) - 3 - methyl - 5 - pyrazolone. If 3-methyl-5-pyrazolone be used, a rather bluer red is obtained, whereas 1-(3'-nitrophenyl)-3-methyl-5-pyrazolone yields a brownish-red dyestuff.

Example 5

55 parts of the monoazo dyestuff obtained from 4-nitro-4'-amino-stilbene-2:2'-disulphonic acid and 2-amino-benzene-1-carboxylic acid used in Example 3 are dissolved at 60° C. in 500 parts of water with addition of 160 parts of caustic soda of 30 percent strength and, after addition of 180 parts of grape sugar solution of 10 percent strength, are stirred at 60° C. for 1–2 hours. The dyestuff which separates on cooling is filtered off and dried. It is a red-brown powder which dissolves in conc. sulphuric acid to a blue solution, whereas the parent dyestuff gives a yellowish-red solution.

If less grape sugar—for example, only 120 parts of the above solution—be used for the reduction, another dyestuff is obtained which dissolves in conc. sulphuric acid with a bluish-red color. Presumably in this case the azoxy, in the former the azo stage is obtained, or the two dyestuffs are mixtures in which one or the other stage preponderates.

Example 6

43 parts of 4:4'-dinitrostilbene-2:2'-disulphonic acid as disodium salt, 16.5 parts of 2:5-diaminobenzene-1-carboxylic acid, 1000 parts of water, and 185 parts of caustic soda of 30 percent strength are mixed together in a stirring apparatus and heated for 12 hours at 50–60° C. The condensation product is precipitated by addition of 300 parts of sodium chloride, filtered after cooling, and, if desired, reprecipitated from 500 parts of water by addition of 100 parts of sodium chloride. In order to convert it into the dyestuff containing three azo or azoxy groups, the product is dissolved in 1000 parts of water at about 60° C. 160 parts of caustic soda of 30 percent strength and 200 parts of grape sugar solution of 10 percent strength are added, and the reaction mixture is stirred for about 1 hour at 55–60° C. The compound which separates out on cooling is filtered off and dried. It is a red-brown powder which dissolves in water to an orange-red, in conc. sulphuric acid to a blue solution.

Example 7

9.7 parts of the intermediate product described in Example 5, first paragraph, are dissolved in the form of the sodium salt in 150 parts of water. 1.4 parts of sodium nitrite are added, and the solution is poured, whilst stirring strongly, into a cooled mixture of 13 parts of hydrochloric acid of 30 percent strength and about 40 parts of water. The reaction mixture is stirred for several hours at 5–10° C., when it is added to a solution of 2 parts of 3-methyl-5-pyrazolone made alkaline with sodium carbonate. When coupling is complete, the precipitated dyestuff is filtered off and dried. It is a red-brown powder, which dissolves in water to a yellow-red, in conc. sulphuric acid to a blue solution. When dyed on cotton by either the one- or the two-bath after-coppering process it yields fast red dyeings.

A similar, rather yellower dyestuff is obtained when the tetrazo compound is coupled with 1-phenyl-3-methyl-5-pyrazolone. By using 1-(4'-hydroxy-3'-carboxyphenyl) - 3-methyl-5-pyrazolone a dyestuff yielding brownish red shades can be produced.

Example 8

10 parts of the dyestuff described in the second paragraph of Example 5 are dissolved in 150 parts of water with addition of 1.4 parts of sodium nitrite, and this solution is added, whilst stirring strongly, to a cooled mixture of 13 parts of hydrochloric acid of 30 percent strength and about 40 parts of water. The reaction mixture is stirred for several hours at 5–10° C. and is then added to a solution of 3.5 parts of 1-phenyl-3-methyl-5-pyrazolone made alkaline with sodium carbonate. When coupling is complete the precipitated dyestuff is filtered off and dried. It is a dark red powder which dissolves in conc. sulphuric acid to a blue-violet, in water to a yellowish red solution and dyes cotton by the one- or two-bath after-coppering process in yellowish-red shades.

Example 9

55 parts of the monoazo dyestuff (dyestuff acid) used in Example 3, obtained from diazotized 4-nitro-4'-amidostilbene-2:2'-disulphonic acid and 2-aminobenzene-1-carboxylic acid, are dissolved in 750 parts of lukewarm water by the addition of 26.5 parts of caustic soda of 30 percent strength. The solution, after addition of 6.9 parts of sodium nitrite, is added to a mixture of 53 parts of hydrochloric acid of 30 percent strength and ice water. Stirring is continued for at least ½ hour whilst cooling, and then the reaction mixture is added to a solution of 18 parts of 1-phenyl-3-methyl-5-pyrazolone, made alkaline with sodium carbonate. When coupling is complete the precipitated dyestuff is filtered off. The dyestuff paste is then stirred into 400 parts of hot water; 160 parts of caustic soda of 30 percent strength are now added, the temperature is raised to 60° C. and, after addition of 240 parts of a grape sugar solution of 10 percent strength, the mixture is stirred for about 1 hour at 55–60° C. When cold the precipitated dyestuff is filtered off and dried. It is a red-brown powder which dissolves in conc. sulphuric acid to a blue, in water to an orange red solution and dyes cotton by the one- or two-bath after-coppering process in clear, yellowish red shades. The reduction can also be carried out without intermediate precipitation of the dyestuff.

*Example 10*

7.2 parts of the aminoazo dyestuff obtained by coupling diazotized 5-nitro-2-aminobenzoic acid with 1-phenyl-3-methyl-5-pyrazolone and subsequent reduction of the nitro group are dissolved in 200 parts of boiling water with addition of 2.5 parts of caustic soda of 30 percent strength; to the cooled solution 4.3 parts of 4:4'-dinitrostilbene-2:2'-disulphonic acid in the form of its sodium salt and then 40 parts of sodium hydroxide are added, and the reaction mixture is boiled for 12 hours under reflux. After cooling the precipitated dyestuff is filtered off and dried. It is a dark red powder which dissolves in conc. sulphuric acid to a blue, in water to an orange red solution and dyes cotton in fast red shades in the presence of copper salts.

*Example 11*

8 parts of the disazo dyestuff of the formula

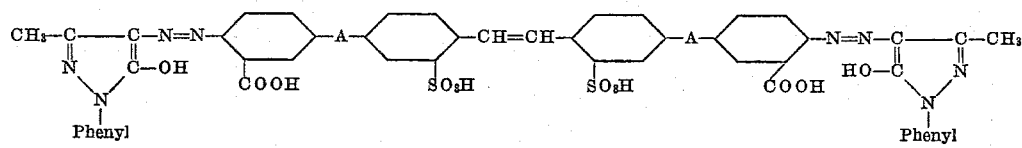

described in Example 9 are suspended in 200 parts of water and, after addition of 4.8 parts of crystalline sodium sulphide, are stirred for some hours at 60–65° C. The aminoazo dyestuff obtained is precipitated by addition of 40 parts of sodium chloride, filtered off, and then subjected to the action of phosgene at about 40° C. in a weakly soda-alkaline solution until no more amino compound is present. The precipitated, dried dyestuff is a dark red powder which dissolves in conc. sulphuric acid to a blue-violet, in water to an orange red solution and dyes cotton in the presence of copper salts in brownish-red shades.

*Example 12*

A dyebath is prepared containing 1.5 parts of the dyestuff obtained in Example 4, paragraph 1, using the intermediate product obtained in Example 2, and 3 parts of sodium carbonate in 3000 parts of water. 100 parts of cotton are entered into the dyebath at 40° C., the temperature is raised to 90–95° C., 30 parts of Glauber's salt are added, and dyeing is continued for ¾ hour at 90–95° C. The dyebath is then cooled to 80° C., the necessary quantity of a solution of copper tartrate made weakly alkaline with sodium carbonate is added, and the cotton is treated for about ½ hour at 80–90° C. It is then thoroughly rinsed and, if desired, soaped for a short time. The cotton is dyed in a fast red shade.

What I claim is:

1. Polyazo dyestuffs of the stilbene series containing at least once the grouping

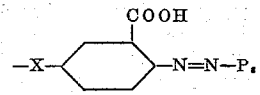

wherein Pz stands for the radical of a pyrazolone coupling component, and X stands for a member of the group consisting of azo- and azoxy groups and is directly attached to the benzoic acid grouping, the X-group being also directly attached to a stilbene radical.

2. Polyazo dyestuffs of the stilbene series containing at least twice the grouping

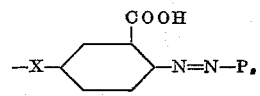

wherein Pz stands for the radical of a pyrazolone coupling component, and X stands for a member of the group consisting of azo- and azoxy-groups and is directly attached to the benzoic acid grouping, the X-group being also directly attached to a stilbene radical.

3. Polyazo dyestuffs of the general formula

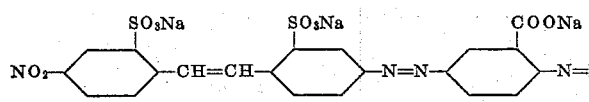

wherein A stands for a member of the group consisting of azo- and azoxy-groups and is directly attached to the benzoic acid grouping, B stands for the radical of a compound containing at least one stilbene grouping, each A being directly attached to a stilbene radical, and Pz stands for the radical of a pyrazolone coupling component.

4. Polyazo dyestuffs of the general formula

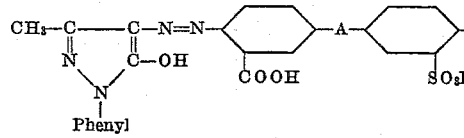

wherein A stands for a member of the group consisting of azo- and azoxy-groups.

5. Polyazo dyestuffs of the general formula

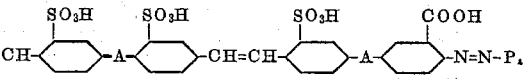

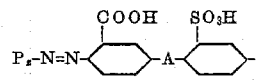

wherein A stands for a member of the group consisting of azo- and azoxy-groups and Pz stands for the radical of a pyrazolone coupling component.

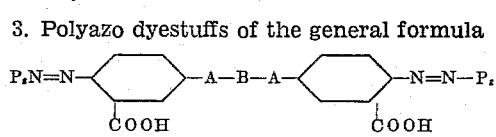

6. Polyazo dyestuffs of the general formula

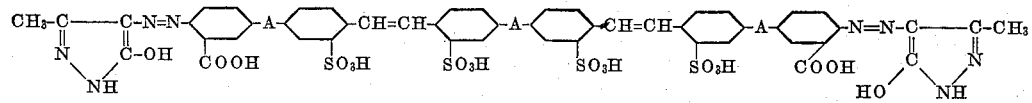

wherein A stands for a member of the group consisting of azo- and azoxy-groups.

7. Polyazo dyestuffs of the general formula

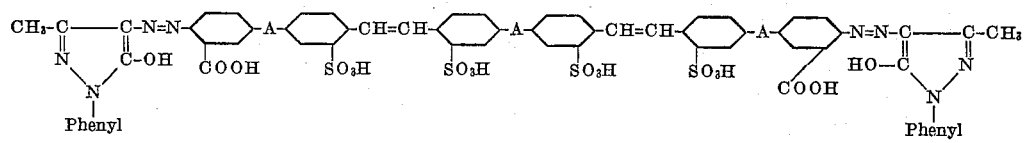

wherein A stands for a member of the group consisting of azo- and azoxy-groups.

8. Process for the manufacture of polyazo dyestuffs of the stilbene series, comprising coupling tetrazotized diamines of the general formula

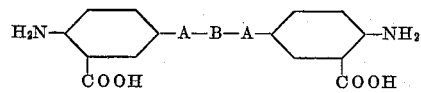

wherein A stands for a member of the group consisting of azo- and azoxy-groups and is directly attached to the benzoic acid grouping and B stands for the radical of a compound containing at least one stilbene grouping, each A being directly attached to a stilbene radical, with pyrazolone coupling components.

9. Process for the manufacture of polyazo dyestuffs of the stilbene series, comprising linking together two molecules of compounds of the general formula

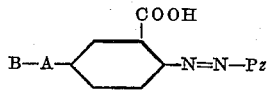

wherein Pz stands for the radical of a pyrazolone coupling component, A stands for a member of the group consisting of azo- and azoxy-groups and is directly attached to the benzoic acid grouping and B stands for a stilbene radical containing a substituent selected from the group consisting of $NO_2$ and $NH_2$.

10. Process for the manufacture of polyazo dyestuffs of the stilbene series, comprising condensing dyestuffs of the general formula

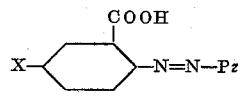

wherein Pz stands for the radical of a pyrazolone coupling component and X stands for a member of the group consisting of $NH_2$ and $NO_2$ with stilbene substitution products containing at least one substituent selected from the group consisting of $NO_2$ and $NH_2$ respectively directly attached to a stilbene radical.

WALTER HANHART.